(No Model.)
L. B. FOSS.
HOLLOW ARTICLE OF SHEET METAL.
No. 358,970. Patented Mar. 8, 1887.
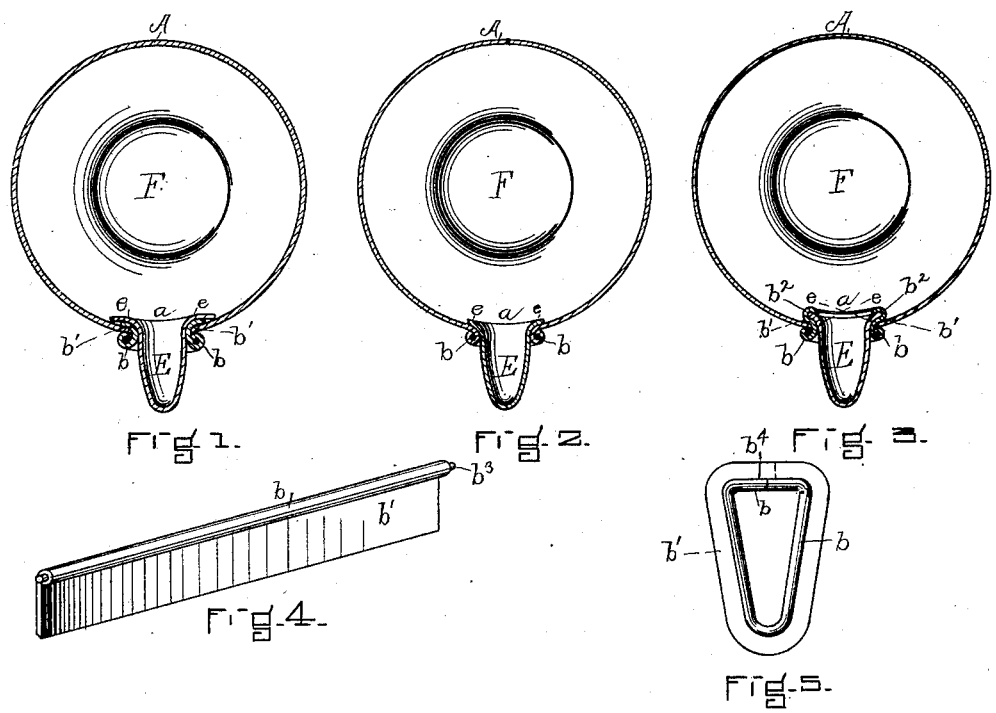
Fig. 1.   Fig. 2.   Fig. 3.
Fig. 4.   Fig. 5.
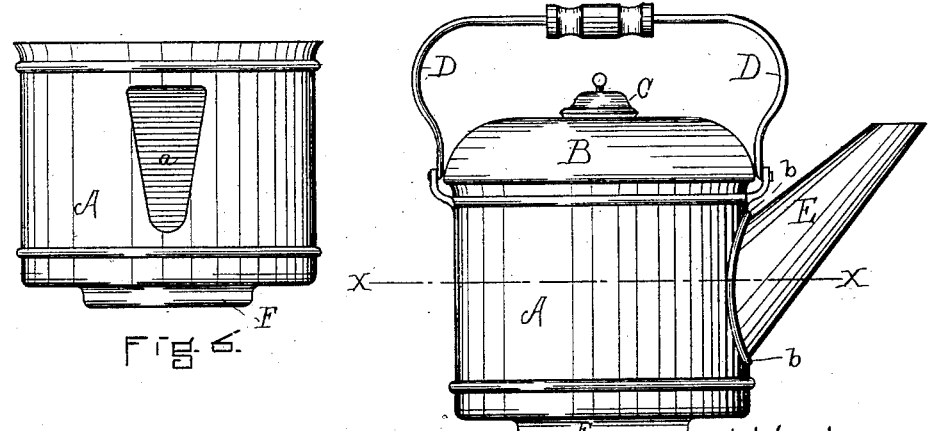
Fig. 6.   Fig. 7.
WITNESSES.   INVENTOR.

United States Patent Office.

L. BACON FOSS, OF BOSTON, MASSACHUSETTS, ASSIGNOR TO THE DOVER STAMPING COMPANY, OF SAME PLACE.

HOLLOW ARTICLES OF SHEET METAL.

SPECIFICATION forming part of Letters Patent No. 358,970, dated March 8, 1887.

Application filed August 28, 1886. Serial No. 212,052. (No model.)

*To all whom it may concern:*

Be it known that I, L. BACON FOSS, of Boston, in the county of Suffolk and State of Massachusetts, a citizen of the United States, have invented a new and useful Improvement in Hollow Articles of Sheet Metal, of which the following is a full, clear, and exact description, reference being had to the accompanying drawings, forming a part of this specification, in explaining its nature.

All sheet-metal vessels which have, when completed, spouts or noses are difficult to make and have the nose continuous with the body of the vessel.

In joining the nose onto a hollow vessel, whether it be a closed or pipe nose, like that of a coffee-pot or tea-kettle, or whether it be an open nose or lip, like that of a pitcher or chocolate-pot, it has been difficult to get a proper finish at the juncture; and particularly has this been the case in articles of copper, where the joining, if made with rivets, shows, and, if made with solder or brazing, is indicated by a seam of different color from that of the body of the vessel. In the juncture of other parts than noses to the body of the vessel this same difficulty occurs at the point of juncture.

The present improvement relates to the making of such junctures of projecting parts with the main body of the hollow vessel.

In the drawings, Figure 7 represents a completed tea-kettle. Fig. 6 is the body of the kettle with the hole for the attachment of the nose perforated through it. Figs. 1, 2, and 3 are sections on the line $x$ $x$ of Fig. 7, showing the method of joining the body with the nose. Figs. 4 and 5 represent the bolster between the body and nose, Fig. 4 in its first form, and Fig. 5 in its applied form.

A is the body of the hollow vessel.

F is its bottom. These two parts may be made in one piece by drawing, spinning, stamping, or hammering in any usual way, or may be made in two pieces, the bottom of one piece and the side of another, and the side may be rolled and seamed, or riveted, or brazed, or continuous, and the side and bottom may be united by flanging, seaming, or in any usual way. The hole $a$, made for the passage of the spout or nose in the body of the vessel, may, if desired, have its outer edge rolled, as shown at $b$, Fig. 2, and this would be practicable in case the inside of the copper vessel were not tinned, but had a copper surface; or, if it were desired to put a different-colored bead around the nose; and the nose E, having a flange, $e$, turned upon its inner edge, would be passed through the hole $a$ and united to the body of the kettle by brazing or soldering. It will be seen that, in lieu of rolling this edge, as shown at $b$, Fig. 2, the attachment by brazing or soldering of a wire of proper size all the way round the hole $a$ of Fig. 6 would produce substantially the same finish, and be substantially equivalent to this roll of metal $b$. I prefer, however, to make the bolster $b$ of a separate piece, and apply it, as shown in Fig. 1 or Fig. 3, which are sections of the body of the kettle A, at the line $x$ $x$. In order to make and apply this bolster in its best form, I take a strip of copper and roll one edge of it, as shown in Fig. 4. As this rolled strip of copper is to be bent in shape to fit the edges of the hole $a$, it will be desirable that the roll formed upon it shall be formed over the wire $b^3$. The strip having been made with a rolled edge, $b$, and a flange, $b'$, as shown in Fig. 4, it is next bent edgewise into a shape which shall fit closely around the outside of the butt of the nose E and inside of the hole $a$, the edges of which hole $a$ come up under the rolled edge of the strip $b$. As the ends abut, as shown in Fig. 5, at $b^4$, by slipping one of them a little past the other in inserting the bolster into the hole $a$ this bolster can be readily adjusted into position and the nose E of the kettle passed through it. Its flange $e$ will lie up flat against the flange $b'$ of the bolster, and the adjacent surfaces being united by soldering or brazing will make a very strong and sightly juncture, the metal being, as shown in Fig. 1, of three thicknesses at the point where the nose passes through the body, while in the construction shown in Fig. 2 the metal is only of two thicknesses at that place. If, however, a still heavier seam is desired at this place, the flange $b'$ of the bolster is made somewhat wider than the flange of the nose, and is turned back over the edge of the flange $e$ of the nose, as shown at $b^2$ of Fig. 3. The result of this operation is to make, as shown in the complete kettle of Fig. 7, a round bead at the juncture of the nose with the body, which round bead of clean metal will thoroughly conceal all the indications of soldering or brazing which usually appear when the edge of the hole $a$ is left raw, and constitute a firm support for the projecting nose.

In Fig. 7 of the drawings, B is the top of the vessel, C is the cover, and D is the bail or handle.

A patent was granted to Krippendorff and Cochran, December 23, 1884, No. 309,788, for tea and coffee pot, in which a double-flanged strip bent in a suitable form was employed to unite the body, nose, and strainer of a tea or coffee pot together; but part of one of the two flanges of the strip was cut away, and it had no bead. The flange of the nose was outside the pot, and not inside; and such a device and the one herein described would not be interchangeable. Another patent was granted to Saulson, August 3, 1869, No. 93,354, for a flanged sleeve, over the sleeve part of which the nose was slipped, and this was applied outside of the body of the vessel. Neither of these devices had any bead; neither was applied as my device is applied, and neither presented the same appearance when applied.

I claim as my invention and desire to secure by Letters Patent of the United States—

In combination with the body A and flanged nose E of a sheet-metal vessel, the beaded bolster $b$, provided with a flange, $b'$, folded down inside of said body A, one side of said flange $b'$ being in contact with the wall of the body A, and the other side thereof in contact with the flange $e$ of the nose E, substantially as described.

L. BACON FOSS.

Witnesses:
F. F. RAYMOND, 2d,
FRED. B. DOLAN.